Figure 1:
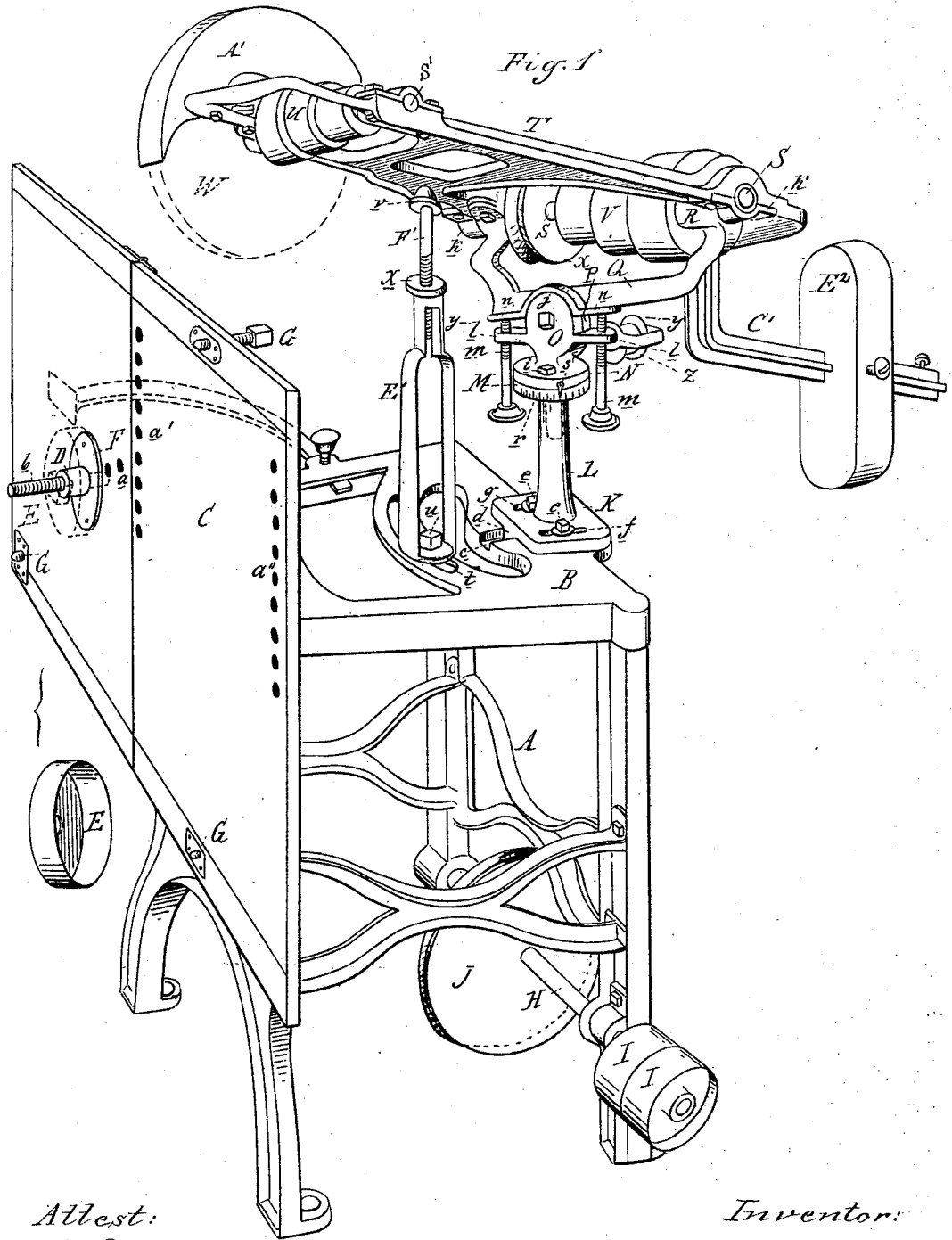

(No Model.)  2 Sheets—Sheet 1.

S. P. OLNEY.
SAW GUMMING MACHINE.

No. 261,624.  Patented July 25, 1882.

Attest:
A. Barthel
Charles J. Hunt

Inventor:
Sanford P. Olney
per Thos. S. Sprague
Atty (No Model.) 2 Sheets—Sheet 2.
S. P. OLNEY.
SAW GUMMING MACHINE.
No. 261,624. Patented July 25, 1882.
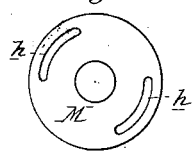
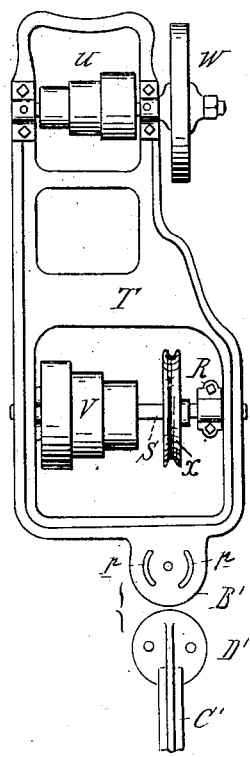
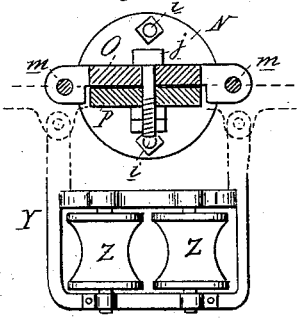
Attest:
A. Barthel
Chas. J. Hunt
Inventor:
Sanford P. Olney
per Thos. S. Sprague
Att'y

UNITED STATES PATENT OFFICE.

SANFORD P. OLNEY, OF DETROIT, MICHIGAN.

SAW-GUMMING MACHINE.

SPECIFICATION forming part of Letters Patent No. 261,624, dated July 25, 1882.

Application filed September 7, 1881. (No model.)

*To all whom it may concern:*

Be it known that I, SANFORD P. OLNEY, of Detroit, in the county of Wayne and State of Michigan, have invented an Improvement in Machines for Gumming Saws, of which the following is a specification.

The nature of this invention relates to certain new and useful improvements in that class of machines which are employed for gumming saws and sharpening and shaping the teeth of the same by means of an emery-wheel revolving upon a swinging carriage; and it relates partly to an improvement upon a previous patent, dated August 26, 1873, No. 142,173.

The object of the construction and improvement is to obtain a machine by means of which the emery-wheel can be adjusted to all the positions necessary for cutting or sharpening all the various forms or shapes of teeth in saws.

The invention consists in the novel details of construction of the various parts and their combination, as more fully hereinafter described.

Figure 1 is a perspective view of my improved machine, showing fully the front thereof and the arrangement of parts. Fig. 2 is the top of the standard, upon which the wheel-carriage has its horizontal radial movement. Fig. 3 is a plan view of the wheel-carriage. Fig. 4 is a section on the line $y\ y$ in Fig. 1.

In the accompanying drawings, which form a part of this specification, A represents the frame of the machine, carrying the table B, which supports the operating parts, and to the front of this frame is secured the folding vertical table C, through which are several series of bolt-holes, $a$, $a'$, and $a''$, to allow the arbor D, upon which the saw is secured, to be changed as is necessary with relation to the emery-wheel. The arbor D terminates at each end in a threaded bolt, one of which is designed to pass through one of the series of holes in the vertical table and be secured thereto by a suitable nut, while the other, $b$, is designed, by means of a suitable nut and hollow washer E, to secure the saw to the front of the vertical table C. A plate or washer, F, is interposed between the saw and the face of the table, and the hollow washer E, with a suitable nut, fastens the saw to the face of the table, so that the face of said saw does not rest against the face of the table, but rests against the washer F. Set-screws G are employed to press against the face of the saw and hold the same near its periphery, at the same distance from the face of the table as the thickness of the washer F. By this method of hanging the saw upon the table all vibration thereof in the process of cutting is avoided, while at the same time the saw has a free rotary motion upon the arbor.

H is the main driving-shaft, suitably journaled to the frame and provided with pulleys I, by means of which and a suitable belt the necessary power is obtained from any suitable source. Upon this shaft is secured the driving-pulley J. Upon the table B there is cut a groove, $c$, which may be rectangular or dovetail in form, to receive a tongue, $d$, of similar form projecting from the bottom of the pedestal K of the standard L. This construction allows such standard to be projected and retracted, its movement being limited by the bolts $e$ passing through the slots $f$ in the pedestal and into the table. The top of the standard terminates in a flat disk, M, which is provided with two or more concentric slots, $h$, and is bored out in the center, as shown in Fig. 2. Upon the top of this disk M rests another disk, N, with bolt-holes through the same coincident with the slots $h$, and its center is provided with a stud, (not shown,) which projects into the central hole in the disk M. These two disks are secured together by means of bolts $i$, which pass through the bolt-holes and slots, and allow, whenever the bolts are loosened, of a free rotary motion. Upon the top of the disk N is cast another disk, O, which stands in a vertical position and is provided with a central hole, through which a bolt, $j$, passes to secure a similar disk, P, which is cast upon the yoke Q. The free ends of this yoke are cast with a hollow trunnion and box, R, in the latter of which the shaft S is journaled, while the wheel-frame T is supported upon the trunnions, being secured thereto by the box-caps $k$. The disk O is provided with ears $l$, through which the set-screws $m$ pass and impinge against the ears $n$, cast upon the yoke Q. The disks O P, being centrally secured together by the bolt $j$, allow of a free vertical semi-rotary movement of the attachments secured above the same, such movement being limited and changed at will by means of the set-screws $m$.

Upon the shafts S S' are secured pulleys V V, by means of which and a suitable belt motion is communicated to the pulleys U and the shaft upon which they are secured, and the emery-wheel W, which is secured upon the projecting end of said shaft. Upon the shaft S is secured another pulley, X. This pulley, as well as the pulley J, is grooved to receive a round belt, by means of which power is communicated from the shaft H to the shaft S.

In the various movements to which the machine may be subjected—such movements throwing the pulleys J and X out of line with each other—some devices are necessary to compel the belt to successfully transmit the motion without danger of being displaced. In order to do this I secure to the yoke Q a hanger, Y, within which are journaled the idler-pulleys Z, so that the belt, no matter what the position of the swinging frame may be within the limits of its movements, will be prevented from running off the pulley X.

A' is a shield or guard attached to the swinging frame T, to partially inclose the emery-wheel W. The tail of the swinging frame is provided with a flat disk, B', through which is a suitable central hole, o, and with concentric slots p. An arm, C', is cast with a disk, D', and provided with a central steady-pin to engage in the hole o, and with bolt-holes coincident with the concentric slots p, and suitable bolts passing through such bolt-holes and slots securing the arm C' to the swinging frame T in such manner that by loosening the connecting-bolts through the disks the arm, which is provided with an adjustable counterbalance-weight, $E^2$, may be readily adjusted as the position of the swinging frame may require.

Upon a portion of the periphery of the disk M there is cut or secured a scale or index, r, and upon the edge of the disk N an index-finger, s, is fastened for the purpose of aiding in accurately adjusting the position of the swinging frame. A radial, slot, t, is cut in the table, and a standard, E', is secured thereto by the bolt u. Through the upper end of this standard passes the set-screw F', the top of which terminates in a head-rest, v, and a jam-nut, x, is employed to lock such set-screw in its desired position. This set-screw forms a means for arresting the descent of the swinging frame below the desired point, while the radial slot in the table allows the rest to be adjusted to any of the positions of such swinging frame.

By the use of this machine saws may be gummed and their teeth shaped or sharpened in any desired form, the machine being susceptible, by the means described, of adjustment to suit all the circumstances. It will be observed that the swinging frame has a radial movement, vertical upon the trunnions which support it, that the frame has a lateral rotary motion upon the vertical disk and a horizontal rotary movement upon the disks at the head of the standard, and that means are provided, as hereinbefore described, for regulating each of these movements.

I am aware of the patent of J. A. Miller, dated June 15, 1875, No. 164,470; and I do not claim the construction shown in said patent.

What I claim as my invention is—

1. In combination, with the table B and the swinging frame T, the adjustable standard L, the disks M, N, O, and P, the yoke Q, and the adjustable support E' F', substantially as and for the purpose specified.

2. In a device for the purposes described, and in combination with the standard L and disks M and N, the disks O P, for the purpose of allowing a horizontal rotary motion of the swinging frame T and a vertical rotary motion of the same, substantially as set forth.

3. In a machine for the purposes described, the frame T, adapted to swing upon the trunnions R, and provided with a tail-arm, C', laterally adjustable upon said frame by means of the disks B' D', substantially as specified.

4. In a device for the purposes described, and as a means for arresting the descent of the swinging-wheel frame, the standard E', radially adjustable upon the table, and provided with an adjusting-screw, F', screwing vertically into its upper end, substantially as set forth.

5. In a device for gumming saws, the disk o, adjustable in a horizontal radial direction on its supporting-standard L, and provided with arms l l and set-screws m m, in combination with the yoke Q, provided with a disk, P, and lugs n, as and for the purpose specified.

6. In a machine for gumming saws, the vertical table C, provided with a series of holes, and an adjustable arbor, D, and with set-screws G, and a disk-plate, F, in combination with a device, substantially as described, for securing the saw to the table against the disk-plate F, and screws G, as and for the purpose specified.

7. In a machine for the purposes described, and as a means for supporting the swinging frame upon its standard, the yoke Q, provided with trunnions and bearings R, for supporting the swinging frame T with a weighted arm, C', and with a disk, P, by which it is adjustably secured upon the supporting-standard L, in combination with said standard and the swinging frame T, substantially as and for the purposes specified.

SANFORD P. OLNEY.

Witnesses:
CHARLES J. HUNT,
E. SCULLY.